United States Patent
Rimmer et al.

(10) Patent No.: US 10,432,586 B2
(45) Date of Patent: Oct. 1, 2019

(54) TECHNOLOGIES FOR HIGH-PERFORMANCE NETWORK FABRIC SECURITY

(71) Applicant: INTEL CORPORATION, Santa Clara, CA (US)

(72) Inventors: Todd M. Rimmer, Exton, PA (US); Thomas D. Lovett, Portland, OR (US); Alberto J. Munoz, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 70 days.

(21) Appl. No.: 15/531,168

(22) PCT Filed: Dec. 27, 2014

(86) PCT No.: PCT/US2014/072462
§ 371 (c)(1),
(2) Date: May 26, 2017

(87) PCT Pub. No.: WO2016/105447
PCT Pub. Date: Jun. 30, 2016

(65) Prior Publication Data
US 2017/0339106 A1 Nov. 23, 2017

(51) Int. Cl.
*H04L 29/06* (2006.01)
*H04L 12/64* (2006.01)
(Continued)

(52) U.S. Cl.
CPC ...... *H04L 63/0236* (2013.01); *H04L 12/6418* (2013.01); *H04L 47/32* (2013.01);
(Continued)

(58) Field of Classification Search
CPC . H04L 63/0236; H04L 67/141; H04L 63/166; H04L 49/25; H04L 47/32;
(Continued)

(56) References Cited

U.S. PATENT DOCUMENTS 7,103,626 B1 * 9/2006 Recio ............... H04L 29/12207
709/201
7,721,324 B1 * 5/2010 Jackson ................. H04L 41/28
709/225
(Continued)

OTHER PUBLICATIONS

Lee et al., "A Comprehensive Framework for Enhancing Security in InfiniBand Architecture", Oct. 2007, IEEE Transactions on Parallel and Distributed Systems, vol. 18, No. 10, pp. 1393-1406. (Year: 2007).*
(Continued)

*Primary Examiner* — Matthew Smithers
(74) *Attorney, Agent, or Firm* — Barnes & Thornburg LLP

(57) ABSTRACT

Technologies for fabric security include one or more managed network devices coupled to one or more computing nodes via high-speed fabric links. A managed network device enables a port and, while enabling the port, securely determines the node type of the link partner coupled to the port. If the link partner is a computing node, management access is not allowed at the port. The managed network device may allow management access at certain predefined ports, which may be connected to one of more management nodes. Management access may be allowed for additional ports in response to management messages received from the management nodes. The managed network device may check and verify data packet headers received from a compute node at each port. The managed network device may rate-limit management messages received from a compute node at each port. Other embodiments are described and claimed.

21 Claims, 3 Drawing Sheets

(51) Int. Cl.
 *H04L 12/823* (2013.01)
 *H04L 12/947* (2013.01)
 *H04L 29/08* (2006.01)

(52) U.S. Cl.
 CPC ............ *H04L 49/25* (2013.01); *H04L 63/166* (2013.01); *H04L 67/141* (2013.01)

(58) Field of Classification Search
 CPC ............ H04L 12/6418; H04L 812/801; H04L 12/741; H04L 12/937
 See application file for complete search history.

(56) References Cited

U.S. PATENT DOCUMENTS

| | | | | |
|---|---|---|---|---|
| 7,733,855 | B1* | 6/2010 | Torudbaken | H04L 12/4641 370/389 |
| 9,270,701 | B1* | 2/2016 | Lamb | H04L 63/20 |
| 2004/0215848 | A1* | 10/2004 | Craddock | H04L 49/90 710/39 |
| 2005/0271074 | A1* | 12/2005 | Johnsen | H04L 49/205 370/428 |
| 2006/0230098 | A1* | 10/2006 | Shen | H04L 67/327 709/201 |
| 2007/0002899 | A1 | 1/2007 | Raman et al. | |
| 2012/0106572 | A1* | 5/2012 | Green | H04L 12/4625 370/466 |
| 2012/0311123 | A1* | 12/2012 | Johnsen | H04L 9/3234 709/223 |
| 2013/0182722 | A1 | 7/2013 | Vishveswaraiah et al. | |
| 2014/0003433 | A1* | 1/2014 | Narayanaswamy | H04L 49/355 370/392 |
| 2014/0215580 | A1* | 7/2014 | Behringer | H04L 63/105 726/5 |

OTHER PUBLICATIONS

Lee et al., "Security Enhancement in InfiniBand Architecture", 2005, IEEE, pp. 1-18. (Year: 2005).*
Written opinion for PCT application No. PCT/US2014/072462, dated Sep. 24, 2015 (3 pages).
European Office action in European patent No. 14909273.6, dated Jun. 26, 2019 (6 pages).
Extended European search report for European patent application No. 14909273.6, dated Jul. 11, 2018 (8 pages).

* cited by examiner

TECHNOLOGIES FOR HIGH-PERFORMANCE NETWORK FABRIC SECURITY

CROSS REFERENCE TO RELATED APPLICATIONS

The present application claims priority to and is a national stage entry under 35 USC § 371(b) of International Application No. PCT/US2014/072462, which was filed Dec. 27, 2014, entitled "TECHNOLOGIES FOR HIGH-PERFORMANCE NETWORK FABRIC SECURITY."

BACKGROUND

High performance computing (HPC) clusters, cloud computing datacenters, and other large-scale computing networks may communicate over a high-speed input/output fabric such as an InfiniBand™ fabric. The InfiniBand™ architecture may transfer data using switched, point-to-point channels between endnodes. In the InfiniBand™ architecture, an endnode may be identified within a subnet using a 16-bit local identifier (LID). Typical network fabrics assume that all elements of the fabric, such as nodes, switches, gateways, and management agents, are trusted. As such, typical network fabrics may be vulnerable to malicious software executed on computing devices connected to the fabric.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
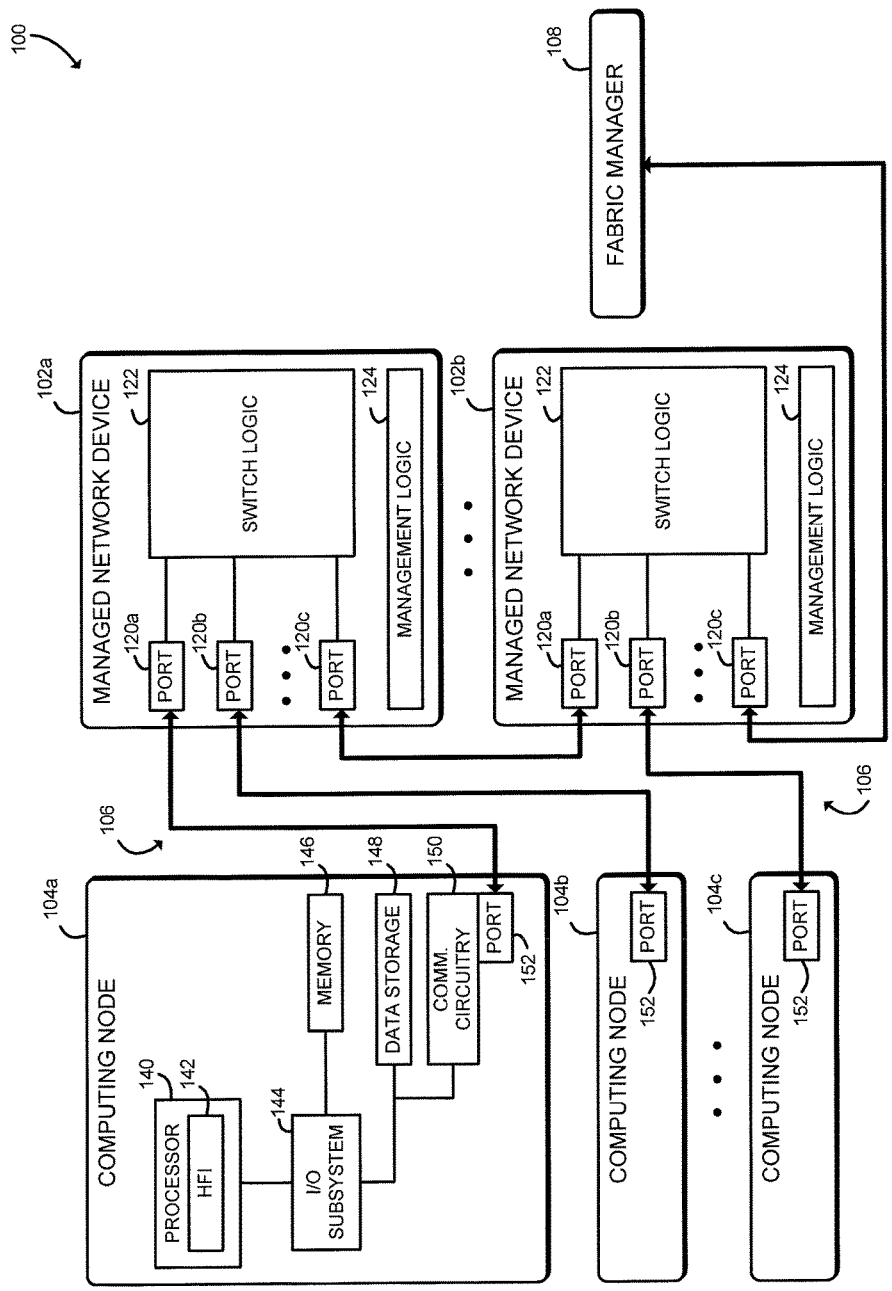
FIG. 1 is a simplified block diagram of at least one embodiment of a system for fabric security.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C): (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in one embodiment, a system 100 for high-performance fabric security includes a number of managed network devices 102 and a number of computing nodes 104 communicating via several fabric links 106. The managed network devices 102, the computing nodes 104, and other attributes of the system 100 may be managed by one or more fabric managers 108. In use, as discussed in more detail below, the fabric manager 108 configures and otherwise manages elements of the fabric by sending management messages over a predefined management partition of the fabric. Each managed network device 102 protects the management partition by controlling whether management access is allowed through each port 120 of the managed network device 102. The fabric manager 108 is coupled to a port 120 that allows management, and each computing node 104 is coupled to a port 120 that does not allow management. The managed network device 102 allows management traffic from the fabric manager 108 to pass to the computing nodes 104 and/or to other fabric managers 108 and allows management traffic from the computing nodes 104 to pass to the fabric manager 108, but denies management traffic from a computing node 104 to another computing node 104. The managed network device 102 securely identifies whether a link partner coupled to the port is a computing node 104 (rather than another managed network device 102) before the port 120 is fully enabled. The managed network device 102 may also check and verify data packet headers and rate-limit management messages from computing nodes 104 connected to non-management ports 120. Thus, system 100 may protect the availability and the integrity of the fabric against malicious software and/or firmware executing on one or more of the computing nodes 104. In particular, spoofing attacks in which a computing node 104 impersonates a different computing node 104 or managed network device 102 may be prevented. Additionally, by preventing management traffic from the computing nodes 104, the configuration information of the fabric may be protected from unauthorized modification or access. Further, rate-limiting management messages may protect the fabric manager 108 from denial-of-service (DoS) attacks.

Each managed network device 102 may be embodied as any network device capable of forwarding or controlling fabric traffic, such as a managed switch. The illustrative managed network device 102 includes a number of fabric ports 120, a switch logic 122, and a management logic 124. Each fabric port 120 may be connected to a fabric link 106, which in turn may be connected to a remote device such as a computing node 104 or another managed network device 102. The illustrative managed network device 102 includes three fabric ports 120a through 120c; however, in other embodiments the managed network device 102 may include additional or fewer ports 120 to support a different number of fabric links 106.

The switch logic 122 may be embodied as any hardware, firmware, software, or combination thereof configured to forward data packets received on the ports 120 to appropriate destination ports 120. For example, the switch logic 122 may be embodied as a shared memory switch or a crossbar switch, and may include a scheduler, packet processing pipeline, linear forwarding tables, port group forwarding tables, port group tables, and/or any other switching logic. In some embodiments, the switch logic 122 may be embodied as one or more application-specific integrated circuits (ASICs).

The management logic 124 may be embodied as any control circuit, microprocessor, or other logic block that may be used to configure and control the managed network device 102. For example, the management logic 124 may initialize the managed network device 102 and its components, control the configuration of the managed network device 102 and its components, provide a testing interface to the managed network device 102, or provide other management functions. The management logic 124 may be configured by changing the values of a number of registers, attributes, and/or data tables, such as a port information attribute. The fabric manager 108 may communicate with the management logic 124 using an in-band management interface by transmitting specially formatted management datagrams (MADs) over the fabric links 106. Additionally or alternatively, the management logic 124 may communicate with the fabric manager 108 over a management interface such as one or more PCI Express host interfaces, a test interface, or one or more low-speed interfaces such as an I2C interface, a JTAG interface, an SPI interface, an MDIO interface, an LED interface, or a GPIO interface.

Each computing node 104 may be embodied as any type of computation or computer device capable of performing the functions described herein, including, without limitation, a computer, a server, a rack-mounted server, a blade server, a network appliance, a web appliance, a multiprocessor system, a distributed computing system, a processor-based system, a mobile computing device, and/or a consumer electronic device. As shown in FIG. 1, each computing node 104 illustratively includes a processor 140, an input/output subsystem 144, a memory 146, a data storage device 148, and communication circuitry 150. Of course, the computing node 104 may include other or additional components, such as those commonly found in a computer (e.g., various input/output devices), in other embodiments. Additionally, in some embodiments, one or more of the illustrative components may be incorporated in, or otherwise form a portion of, another component. For example, the memory 146, or portions thereof, may be incorporated in the processor 140 in some embodiments.

The processor 140 may be embodied as any type of processor capable of performing the functions described herein. For example, the processor 140 may be embodied as a single or multi-core processor(s), digital signal processor, microcontroller, or other processor or processing/controlling circuit. The processor 140 further includes a host fabric interface 142. The host fabric interface 142 may be embodied as any communication interface, such as a network interface controller, communication circuit, device, or collection thereof, capable of enabling communications between the processor 140 and other remote computing nodes 104 and/or other remote devices over the fabric links 106. The host fabric interface 142 may be configured to use any one or more communication technology and associated protocols (e.g., the Intel® Omni-Path Architecture) to effect such communication. The host fabric interface 142 may include trusted hardware capable of supplying a node type (i.e., host fabric interface as opposed to switch or gateway) to the remote link partner over the fabric link 106. Although illustrated as including a single processor 140, it should be understood that each computing node 104 may include multiple processors 140, and each processor 140 may include an integrated host fabric interface 142.

Similarly, the memory 146 may be embodied as any type of volatile or non-volatile memory or data storage capable of performing the functions described herein. In operation, the memory 146 may store various data and software used during operation of the computing node 104 such as operating systems, applications, programs, libraries, and drivers. The memory 146 is communicatively coupled to the processor 140 via the I/O subsystem 144, which may be embodied as circuitry and/or components to facilitate input/output operations with the processor 140, the memory 146, and other components of the computing node 104. For example, the I/O subsystem 144 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 144 may form a portion of a system-on-a-chip (SoC) and be incorporated, along with the processor 140, the memory 146, and other components of the computing node 104, on a single integrated circuit chip. The data storage device 148 may be embodied as any type of device or devices configured for short-term or long-term storage of data such as, for example, memory devices and circuits, memory cards, hard disk drives, solid-state drives, or other data storage devices.

The communication circuitry 150 of the computing node 104 may be embodied as any communication interface, such as a communication circuit, device, or collection thereof, capable of enabling communications between the computing node 104 and one or more remote computing nodes 104, managed network devices 102, switches, remote hosts, or other devices. The communication circuitry 150 may be configured to use any one or more communication technology (e.g., wired or wireless communications) and associated protocols (e.g., Intel® Omni-Path Architecture, InfiniBand®, Ethernet, Bluetooth®, Wi-Fi®, WiMAX, etc.) to effect such communication. In particular, the communication circuitry 150 includes a port 152 that connects to a fabric link 106. Although illustrated as including a single port 152, in some embodiments each computing node 104 may include multiple ports 152.

Each of the fabric links 106 may be embodied as any point-to-point communication link capable of connecting two ports 120, 152 of the system 100. For example, a fabric link 106 may connect a port 152 of a computing node 104 with a port 120 of a managed network device 102, may connect two ports 120 of two managed network devices 102, and so on. Each fabric link 106 allows communications in both directions. Each fabric link 106 may be embodied as a serial data communication link such as a copper cable, copper backplane, fiber optic cable, or silicon photonics link, and may include multiple communication lanes (e.g., four lanes) to increase total bandwidth. Each fabric link 106 may signal data at a wire speed such as 12.5 Gb/s or 25.78125 Gb/s.

The fabric manager 108 is configured to initialize and otherwise manage the managed network devices 102, computing nodes 104, and other hosts, gateways, and/or other devices of the system 100. The fabric manager 108 may be embodied as any type of server computing device, network device, or collection of devices, capable of performing the functions described herein. For example, the fabric manager 108 may be embodied as a computing node 104 that has been designated or otherwise configured to be a fabric manager 108. In some embodiments, the system 100 may include multiple fabric managers 108 of which a primary fabric manager 108 may be selected. As such, the fabric manager 108 may be embodied as a single server computing device or a collection of servers and associated devices. Accordingly, although the fabric manager 108 is illustrated in FIG. 1 as embodied as a single computing device, it should be appreciated that the fabric manager 108 may be embodied as multiple devices cooperating together to facilitate the functionality described below.

Figure 2:
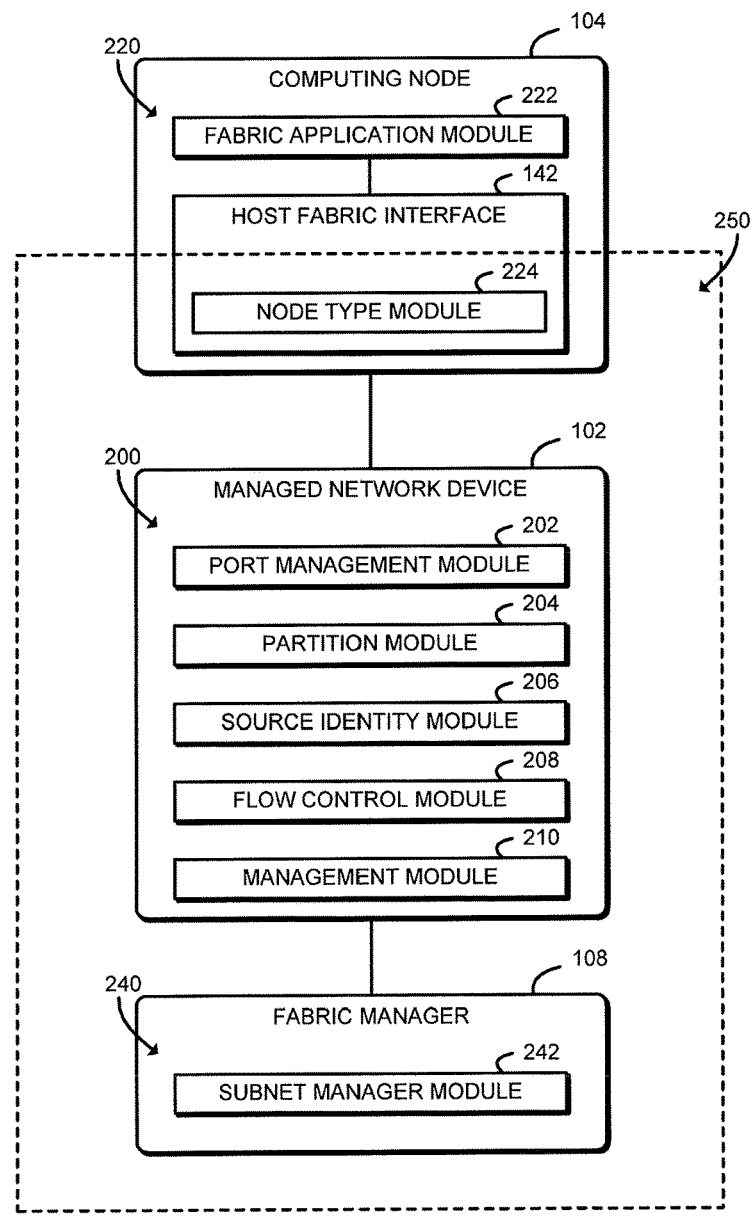
FIG. 2 is a simplified block diagram of at least one embodiment of various environments that may be established by the system of FIG. 1.

Referring now to FIG. 2, in an illustrative embodiment, each managed network device 102 establishes an environment 200 during operation. The illustrative environment 200 includes a port management module 202, a partition module 204, a source identity module 206, a flow control module 208, and a management module 210. The various modules of the environment 200 may be embodied as hardware, firmware, software, or a combination thereof. For example the various modules, logic, and other components of the environment 200 may form a portion of, or otherwise be established by, the switch logic 122, the management logic 124, or other hardware components of the managed network device 102. As such, in some embodiments, any one or more of the modules of the environment 200 may be embodied as a circuit or collection of electrical devices (e.g., a port management circuit, a partition circuit, etc.).

The port management module 202 is configured to enable the ports 120 of the managed network device 102 and securely determine whether each port 120 is an edge port 120 while the port 120 is being enabled. An edge port 120 is a port 120 connected to a computing node 104 (or a gateway). The port management module 202 may determine whether the first port is an edge port by securely identifying whether each port 120 is coupled to a remote computing node 104. The port management module 202 is also configured to configure each of the ports 120 to allow or disallow management access. The port management module 202 may configure each port 120 to be associated with a limited member or a full member of a management partition of the fabric.

The partition module 204 is configured to enforce the fabric management partition at each of the ports 120. The fabric management partition includes one or more end nodes of the fabric (e.g., computing nodes 104 and/or the fabric manager 108) that may communicate with each other. The fabric management partition may include full members (the fabric manager 108) and limited members (the computing nodes 104). For ports 120 configured to disallow management access, the partition module 204 is configured to deny incoming packets indicating full membership in the management partition and to deny outgoing packets indicating limited membership in the management partition. For ports 120 configured to allow management access, the partition module 204 is configured to allow incoming and outgoing packets indicating limited or full membership in the management partition. Thus, the partition module 204 is configured to allow full members of the management partition (connected to management ports 120) to communicate with both full members and limited members of the management partition, and to allow limited members of the management partition (connected to non-management ports 120) to communicate only with full members and not limited members of the management partition.

The source identity module 206 is configured to determine whether source local identifiers (SLIDs) included in data packets received at the ports 120 match predefined SLIDs associated with each respective port 120. The source identity module 206 is further configured to drop data packets that do not include a matching SLID.

The flow control module 208 is configured to rate-limit management messages received on non-management ports 120. The flow control module 208 may reduce a rate of credit return for the non-management port 120 in response to receiving a management message. The flow control module 208 may be configured to rate-limit messages on a particular subdivision of the fabric link 106, such as a particular virtual lane or service channel.

The management module 210 is configured to manage the configuration of the managed network device 102. The management module 210 may store or otherwise manage one or more configuration registers, attributes, data tables, or other management information that may be used to configure the managed network device 102. For example, in some embodiments, the management module 210 may manage port information attributes, including whether management is allowed for each port 120. The management module 210 may be configured to receive commands, data, and other management information from the fabric manager 108.

Still referring to FIG. 2, in an illustrative embodiment each computing node 104 establishes an environment 220 during operation. The illustrative environment 220 includes a fabric application module 222 and a node type module 224. The various modules of the environment 220 may be embodied as hardware, firmware, software, or a combination thereof. For example the various modules, logic, and other components of the environment 220 may form a portion of, or otherwise be established by, the processor 140 or other hardware components of the computing node 104. As such, in some embodiments, any one or more of the modules of the environment 220 may be embodied as a circuit or collection of electrical devices (e.g., a fabric application circuit or a node type circuit).

The fabric application module 222 may be embodied as any software and/or firmware executed by the computing node 104 that communicates data using the host fabric interface 142 of the computing node 104. For example, the fabric application module 222 may include one or more operating systems, virtual machine monitors, hypervisors, virtual machines, and/or application software. In some embodiments, the fabric application module 222 may also include embedded firmware of the computing node 104, including firmware associated with the host fabric interface 142 and/or the communication circuitry 150. The fabric application module 222 may be under the control of one or more users of the computing node 104 and thus may not be trustworthy.

The node type module 224 is configured to securely identify the node type of the computing node 104 to the managed network device 102 via the fabric link 106. For example, the node type module 224 may transmit a node type identifier to the managed network device 102 during a link negotiation and initialization process for the fabric link 106. The node type identifier may identify that the computing node 104 is not a switch and is instead a different type of device (e.g., an endpoint, a computing node, a gateway, or other fabric element). The node type module 224 may also be configured to transmit a globally unique identifier of the computing node 104 to the managed network device 102 during the link negotiation and initialization process. The node type module 224 is configured to correctly identify the node type of the computing node 104 and may not be modified by software and/or firmware executed by the computing node 104 (e.g., the node type may not be altered by the fabric application module 222). In the illustrative embodiment, the node type module 224 is embodied as a physical hardware component of the host fabric interface 142.

Still referring to FIG. 2, in an illustrative embodiment the fabric manager 108 establishes an environment 240 during operation. The illustrative environment 240 includes a subnet manager module 242. The various modules of the environment 240 may be embodied as hardware, firmware, software, or a combination thereof. For example the various modules, logic, and other components of the environment 240 may form a portion of, or otherwise be established by, the processor or other hardware components of the fabric manager 108. As such, in some embodiments, any one or more of the modules of the environment 240 may be embodied as a circuit or collection of electrical devices (e.g., a subnet manager circuit).

The subnet manager module 242 is configured to manage all of the elements of the network fabric. For example, the subnet manager module 242 may discover fabric topology and configure managed network devices 102 and/or host fabric interfaces 142 connected to the fabric. The subnet manager module 242 is configured to allow delegation of management functions to other management nodes by configuring ports 120 of the managed network devices 102 to allow management traffic. In some embodiments, the subnet manager module 242 may be configured to support bringing into the fabric a new managed network device 102 that has an untrusted configuration of management ports 120. The subnet manager module 242 may disable management access from the new managed network device 102 before bringing up the fabric link 106 (e.g., by omitting the full membership partition key on the inter-switch fabric link 106) and keep management access disabled until after disabling management access on all of the new managed network device 102 ports 120 (e.g., by removing the full membership partition key from each port). If a fabric manager 108 or rogue agent attached to the new managed network device 102 attempts the same process, the subnet manager module 242 may take the fabric link 106 down to prevent the attack.

As shown in FIG. 2, in use the system 100 establishes a trust boundary 250. The trust boundary 250 includes the managed network devices 102, the fabric manager 108, and only the node type module 224 of the host fabric interface 142 of each computing node 104. Operating system software, application software, firmware, and other elements of the computing node 104 outside of the trust boundary 250 are untrusted and thus may be under control of one or more malicious actors.

Figure 3:
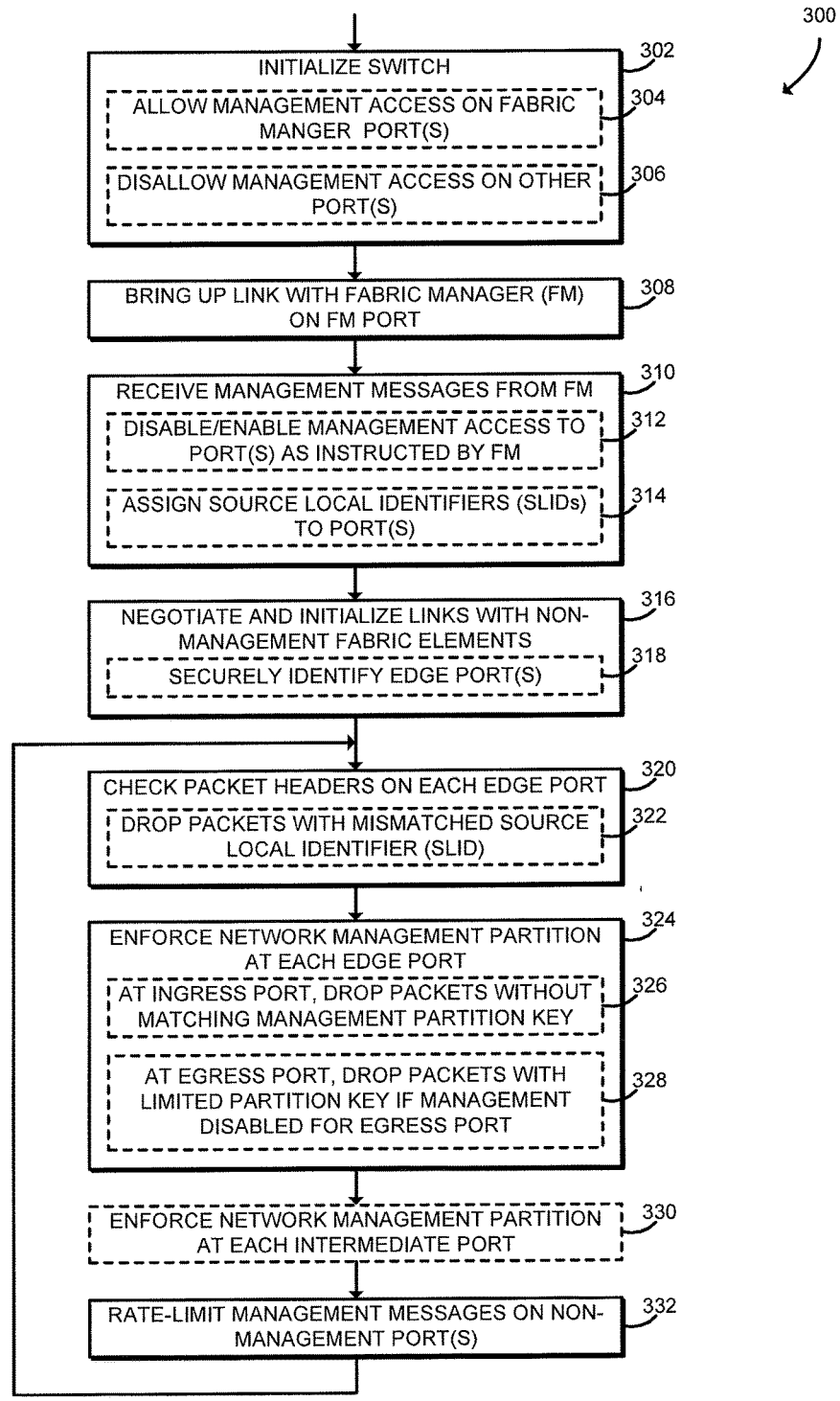
FIG. 3 is a simplified flow diagram of at least one embodiment of a method for fabric security that may be executed by a managed network device of the system of FIGS. 1 and 2.

Referring now to FIG. 3, in use, a managed network device 102 may execute a method 300 for fabric security. The method 300 begins in block 302, in which the managed network device 102 is initialized. The managed network device 102 may begin initialization when initially powered on, when reset, or when otherwise instructed to re-initialize. In some embodiments, the managed network device 102 may restore a previous configuration, for example from a non-volatile memory within the managed network device 102. Additionally or alternatively, in some embodiments the managed network device 102 may be initialized into a default configuration that preserves fabric security.

In some embodiments, in block 304 the managed network device 102 may allow management access on certain predefined ports 120 of the managed network device 102. That is, the managed network device 102 may allow the fabric element connected to each of those predefined ports 120 to operate as a management node (e.g., as a fabric manager 108). Thus, those ports 120 configured to allow management access may be known as management ports or fabric manager (FM) ports, as opposed to other non-management ports 120. Because each FM port 120 may be predefined, preconfigured, or otherwise configured out-of-band, a data center manager or other administrator may verify that only a fabric manager 108 (and not a computing node 104) has been physically connected to the FM port 120. As further described below, in-band management traffic may be communicated to the managed network device 102 using a predefined management partition of the network fabric. The managed network device 102 may allow management access to the FM ports 120 by associating a predefined full membership partition key of the management partition to each FM port 120. The full membership partition key, also known as a protection key or P_Key, may be embodied as a digital value that identifies the network partition and indicates whether the associated node has full membership or limited membership in the partition. For example, the full membership partition key may be embodied as the 16-bit value 0xFFFF, with the most-significant bit indicating full membership. The managed network device 102 may maintain a table of allowed P_Key values for each port 120. The managed network device 102 may be configured to allow management by setting an appropriate field in the port information attribute associated with the FM port 120 (e.g., a MgmtAllowed field of the PortInfo attribute). Setting the MgmtAllowed field may ensure that the full membership partition key is included in the P_Key table of the associated FM port 120.

In some embodiments, in block 306 the managed network device 102 may disallow management access on all other ports 120 (i.e., all ports 120 other than the predefined FM ports 120). In other words, the managed network device 102 may disallow the fabric elements connected to all other ports 120 to operate as management nodes. The managed network device 102 may disallow management access to those ports 120 by associating a predefined limited membership partition key of the management partition to each port 120. For example, the limited membership partition key may be embodied as the 16-bit value 0x7FFF, with the most-significant bit indicating limited membership. The managed network device 102 may disallow management access by unsetting an appropriate field in the port information attribute associated with each port 120 (e.g., unsetting a MgmtAllowed field of the PortInfo attribute).

In block 308, the managed network device 102 may bring up a fabric link 106 with the fabric manager 108 on an FM port 120. As described above, the FM port 120 is configured to allow management access. In block 310, the managed network device 102 may receive one or more management messages from the fabric manager 108 via the FM port 120. The management messages may be embodied as, for example, one or more SMA requests and/or SMA trap repress messages. A subnet management agent or other entity of the managed network device 102 may verify that the management messages include the full membership management partition key (e.g., 0xFFFF). In some embodiments, in block 312 the managed network device 102 may enable or disable management access to one or more ports 120 as instructed by the fabric manager 108. For example, the fabric manager 108 may allow management access to a port 120 in order to allow backup fabric manager 108 or other management node to enter the fabric. The fabric manager 108 may enable or disable management access, for example, by setting or unsetting the MgmtAllowed field of the PortInfo attribute of the associated port 120. In some embodiments, in block 314, the fabric manager 108 may assign particular source local identifiers (SLIDs) to each of the ports 120. As described below, the managed network device 102 may verify that all traffic received at a port 120 includes the correct SLID as configured by the fabric manager 108.

In block 316, the managed network device 102 negotiates and initializes fabric links 106 with non-management fabric elements such as switches, gateways, and computing nodes 104. In block 318, in some embodiments the managed network device 102 may securely identify any edge ports 120 while initializing the fabric links 106. An edge port 120 may be embodied as a port 120 that is connected to a computing node 104 and not to another managed network device 102. The managed network device 102 may securely identify the port 120 as an edge port 120 by receiving a node type over the fabric link 106 indicating that the connected fabric element is a computing node 104. The node type may be transmitted by a trusted hardware component of the host fabric interface 142 of the remote computing node 104. For example, during initialization of the fabric link 106, the managed network device 102 may establish a low-speed, low-bandwidth communication over the fabric link 106 known as a "backchannel." The managed network device 102 and the connected fabric element may exchange a node type identifier over the backchannel, along with other data. Thus, the managed network device 102 may determine whether the port 120 is an edge port 120 prior to fully bringing up the fabric link 106. After bringing up the fabric link 106, the managed network device 102 is prepared to process data packets received on one or more ports 120.

In block 320, the managed network device 102 checks packet headers received on each edge port 120. Each data packet may be embodied as a collection of binary data including one or more headers and a data payload. In some embodiments, the managed network device 102 may check the consistency and correctness of headers at the data link layer (i.e., layer 2 headers). The managed network device 102 may, for example, perform basic checks like determining whether the header includes a valid layer 2 header type or a valid length consistent with the MTU of the given virtual lane. In some embodiments, in block 322, the managed network device 102 may verify that the source local identifier (SLID) of the data packet matches a configured SLID associated with the particular edge port 120. As described above, the fabric manager 108 may assign appropriate SLIDs to each port 120 of the managed network device 102. The managed network device 102 drops, denies, or otherwise rejects the data packet if the SLID of the data packet does not match the SLID associated with the edge port 120. Thus, the managed network device 102 may prevent spoofing attacks in which a malicious computing node 104 attempts to impersonate another device on the fabric. Prior to an SLID being assigned to the edge port 120, and by default in response to being powered on or otherwise reset, the managed network device 102 may discard any packets (including SMA packets) from the computing node 104 that include inconsistent SLIDs. The managed network device 102 may allow SMA packets with their SLID set as the permissive LID (e.g., 0xFFFF).

In block 324, the managed network device 102 enforces the network management partition at each edge port 120. In particular, the managed network device 102 allows a fabric manager 108 or other management node connected to a FM port 120 to communicate with all other fabric elements (e.g., other fabric managers 108 and/or computing nodes 104). The managed network device 102 also allows a computing node 104 to communicate with the fabric manager 108, but does not allow a computing node 104 to communicate via the management partition with other computing nodes 104. By enforcing the management partition, the managed network device 102 may protect the configuration of the entire fabric.

In some embodiments, in block 326, the managed network device 102 may drop packets at each ingress port 120 that do not include a matching partition key. A data packet may include in its header a partition key (P_Key). Upon receipt of a data packet at an ingress port 120, the managed network device 102 determines whether the P_Key of the data packet matches any key stored in the P_Key table associated with the ingress port 120. If no match is found, the managed network device 102 drops the data packet and may signal an error. For example, as described above, a non-management port 120 may include the limited membership partition key (e.g., 0x7FFF) but not the full membership partition key (e.g., 0xFFFF) in its P_Key table. The managed network device 102 may thus drop any data packets received on that port that include the full membership partition key. Accordingly, the managed network device 102 may prevent a computing node 104 connected to a non-management port 120 from originating a full-membership management partition message. As described above, subnet management agents or other entities of fabric elements may only respond to management messages including the full-membership partition key. Thus, by enforcing the management partition, the managed network device 102 may protect the fabric configuration. As another example, an FM port 120 may include the full membership partition key but not the limited membership partition key in its P_Key table. The managed network device 102 may thus permit any data packets received on that port that include the limited or full membership partition key.

In some embodiments, in block 328, the managed network device 102 may drop packets at each egress port 120 that include the limited management partition key if management access has been disabled for that egress port 120. For example, as described above, a non-management port 120 may include the limited membership partition key (e.g., 0x7FFF) but not the full membership partition key (e.g., 0xFFFF) in its P_Key table. When a packet including the limited membership partition key is ready to be transmitted from that port 120, the managed network device 102 may determine whether the limited membership partition key is also included in the P_Key table. If so, the managed network device 102 drops the packet. Conversely, a data packet including the full membership partition key may be transmitted from a port 120 associated with either the limited membership partition key or the full membership partition key. Thus, a computing node 104 may communicate on the management partition with the fabric manager 108 but not with another computing node 104, and the fabric manager 108 may communicate on the management partition with the computing nodes 104 and with other management nodes. Accordingly, the fabric manager 108 may send management messages to any computing node 104 and each computing node 104 may respond to the fabric manager 108, but computing nodes 104 may not transmit management messages to each other.

In some embodiments, in block 330, the managed network device 102 may enforce the network management partition at each intermediate port 120. An intermediate port 120 is connected to another managed network device 102 in the fabric, such as another switch. In many embodiments, data packets may be forwarded between managed network devices 102 without checking the partition key or otherwise enforcing network partitions. Thus, in those embodiments, the partition enforcement described above in block 324 at the ingress port 120 and egress port 120 may be performed by different managed network devices 102. If enforcing the network management partition for intermediate ports 120, the managed network device 102 may check for the limited membership partition key and the full membership partition key, similar to as described above in connection with block 324.

In block 332, the managed network device 102 rate-limits management messages received on non-management ports 120. The managed network device 102 may perform rate-limiting for messages received on a particular subdivision of the fabric link 106, such as a particular virtual lane or service channel (e.g., virtual lane 15 and/or service channel 15). For example, the managed network device 102 may restrict the number of flow-control credits returned to the computing node 104 for each non-management port 120 (i.e., each port 120 assigned to the limited membership partition key). By restricting the return of credits, the computing node 104 must wait before sending additional management messages. Rate-limiting non-management ports 120 may prevent denial-of-service attacks against the fabric manager 108 by restricting the bandwidth available to computing nodes 104 without restricting bandwidth of the fabric manager 108. After performing rate-limiting, the method 300 loops back to block 320 to continue checking packets and enforcing the management network partition.

Although the method of 300 of FIG. 3 is illustrated as executing sequentially, it should be understood that in some embodiments, the managed network device 102 may perform the operations of the method 300 in parallel, simultaneously, or in any other order. For example, in some embodiments operations may be performed in parallel by hardware resources of the managed network device 102. Additionally, although illustrated as being performed by the managed network device 102, and in some embodiments by hardware resources of the managed network device 102, it should be understood that in some embodiments the operations of the method 300 may be performed by hardware resources of the host fabric interfaces 142 that are securely managed by trusted firmware of the managed network device 102. In those embodiments, the hardware may be specific to the functions provided by the host fabric interface 142, while still preventing software and/or firmware of the computing node 104 from compromising the security functions.

EXAMPLES

Illustrative examples of the technologies disclosed herein are provided below. An embodiment of the technologies may include any one or more, and any combination of, the examples described below.

Example 1 includes a network device for fabric security, the network device comprising a port management module to enable a first port of the network device, wherein the first port is coupled to a link partner; and determine whether the first port is an edge port during enablement of the first port, wherein to determine whether the first port is an edge port comprises to securely identify whether the link partner coupled to the first port is a compute node; and a partition module to enforce a fabric management partition at the first port in response to a determination that the first port is an edge port, wherein the first port is associated with a limited member of the management partition and the limited member is prevented from communicating with other limited members of the management partition.

Example 2 includes the subject matter of Example 1, and wherein to securely identify whether the link partner coupled to the first port is a compute node comprises to establish a backchannel communication session with a host fabric interface of the link partner using the first port; and receive a node type indicator from the host fabric interface via the backchannel communication session.

Example 3 includes the subject matter of any of Examples 1 and 2, and wherein to enable the first port of the network device comprises to associate a limited membership partition key of the fabric management partition with the first port.

Example 4 includes the subject matter of any of Examples 1-3, and wherein to enforce the fabric management partition at the first port comprises to determine whether a partition key of a data packet received at the first port matches the limited membership partition key; and drop the data packet in response to a determination that the partition key of the data packet does not match the limited membership partition key.

Example 5 includes the subject matter of any of Examples 1-4, and wherein to enforce the fabric management partition at the first port comprises to determine whether a partition key of a data packet to be transmitted from the first port matches the limited membership partition key; and drop the data packet in response to a determination that the partition key of the data packet matches the limited membership partition key.

Example 6 includes the subject matter of any of Examples 1-5, and wherein the port management module is further to enable a second port of the network device, wherein the second port is coupled to a management node, and wherein the management node is a full member of the fabric management partition and the management node is allowed to communicate with limited members of the management partition and full members of the management partition; and the partition module is further to enforce the fabric management partition at the second port.

Example 7 includes the subject matter of any of Examples 1-6, and wherein to enable the first port of the network device comprises to associate a limited membership partition key of the fabric management partition with the first port; and to enable the second port of the network device comprises to associate a full membership partition key of the fabric management partition with the second port.

Example 8 includes the subject matter of any of Examples 1-7, and wherein to enforce the fabric management partition at the second port comprises to determine whether a partition key of a data packet received at the second port matches the full membership partition key; and drop the data packet in response to a determination that the partition key of the data packet does not match the full membership partition key.

Example 9 includes the subject matter of any of Examples 1-8, and wherein to enforce the fabric management partition at the second port comprises to determine whether a partition key of a data packet to be transmitted from the second port matches the full membership partition key or the limited membership partition key; and allow the data packet in response to a determination that the partition key of the data packet to be transmitted from the first port matches the full membership partition key or the limited membership partition key.

Example 10 includes the subject matter of any of Examples 1-9, and wherein the port management module is further to initialize the second port; and to enable the second port comprises to enable the second port in response to initialization of the second port.

Example 11 includes the subject matter of any of Examples 1-10, and further comprising a management module to receive a management message from a management node; wherein to enable the second port comprises to enable the second port in response to receipt of the management message.

Example 12 includes the subject matter of any of Examples 1-11, and further comprising a source identity module to determine whether a source local identifier of a data packet received at the first port matches a predefined source local identifier associated with the first port; and drop the data packet in response to a determination that the source local identifier of the data packet does not match the predefined source local identifier.

Example 13 includes the subject matter of any of Examples 1-12, and further comprising a management module to receive the predefined source local identifier from a management node.

Example 14 includes the subject matter of any of Examples 1-13, and further comprising a flow control module to receive a management message via the first port; and reduce a rate of credit return for the first port in response to receipt of the management message.

Example 15 includes a method for fabric security, the method comprising enabling, by a network device, a first port of the network device, wherein the first port is coupled to a link partner; determining, by the network device, whether the first port is an edge port when enabling the first port, wherein determining whether the first port is an edge port comprises securely identifying whether the link partner coupled to the first port is a compute node; and enforcing, by the network device, a fabric management partition at the first port in response to determining that the first port is an edge port, wherein the first port is associated with a limited member of the management partition and the first port is prevented from communicating with other limited members of the management partition.

Example 16 includes the subject matter of Example 15, and wherein securely identifying whether the link partner coupled to the first port is a compute node comprises establishing a backchannel communication session with a host fabric interface of the link partner using the first port; and receiving a node type indicator from the host fabric interface via the backchannel communication session.

Example 17 includes the subject matter of any of Examples 15 and 16, and wherein enabling the first port of the network device comprises associating a limited membership partition key of the fabric management partition with the first port.

Example 18 includes the subject matter of any of Examples 15-17, and wherein enforcing the fabric management partition at the first port comprises determining whether a partition key of a data packet received at the first port matches the limited membership partition key; and dropping the data packet in response to determining the partition key of the data packet does not match the limited membership partition key.

Example 19 includes the subject matter of any of Examples 15-18, and wherein enforcing the fabric management partition at the first port comprises determining whether a partition key of a data packet to be transmitted from the first port matches the limited membership partition key; and dropping the data packet in response to determining the partition key of the data packet matches the limited membership partition key.

Example 20 includes the subject matter of any of Examples 15-19, and further comprising enabling, by the network device, a second port of the network device, wherein the second port is coupled to a management node, and wherein the management node is a full member of the fabric management partition and the management node is allowed to communicate with limited members of the management partition and full members of the management partition; and enforcing, by the network device, the fabric management partition at the second port.

Example 21 includes the subject matter of any of Examples 15-20, and wherein enabling the first port of the network device comprises associating a limited membership partition key of the fabric management partition with the first port; and enabling the second port of the network device comprises associating a full membership partition key of the fabric management partition with the second port.

Example 22 includes the subject matter of any of Examples 15-21, and wherein enforcing the fabric management partition at the second port comprises determining whether a partition key of a data packet received at the second port matches the full membership partition key; and dropping the data packet in response to determining the partition key of the data packet does not match the full membership partition key.

Example 23 includes the subject matter of any of Examples 15-22, and wherein enforcing the fabric management partition at the second port comprises determining whether a partition key of a data packet to be transmitted from the second port matches the full membership partition key or the limited membership partition key; and allowing the data packet in response to determining the partition key of the data packet to be transmitted from the first port matches the full membership partition key or the limited membership partition key.

Example 24 includes the subject matter of any of Examples 15-23, and further comprising initializing, by the network device, the second port; wherein enabling the second port comprises enabling the second port in response to initializing the second port.

Example 25 includes the subject matter of any of Examples 15-24, and further comprising receiving, by the network device, a management message from a management node; wherein enabling the second port comprises enabling the second port in response to receiving the management message.

Example 26 includes the subject matter of any of Examples 15-25, and further comprising determining, by the network device, whether a source local identifier of a data packet received at the first port matches a predefined source local identifier associated with the first port; and dropping, by the network device, the data packet in response to determining that the source local identifier of the data packet does not match the predefined source local identifier.

Example 27 includes the subject matter of any of Examples 15-26, and further comprising receiving, by the network device, the predefined source local identifier from a management node.

Example 28 includes the subject matter of any of Examples 15-27, and further comprising receiving, by the network device, a management message via the first port; and reducing, by the network device, a rate of credit return for the first port in response to receiving the management message.

Example 29 includes a computing device comprising a processor; and a memory having stored therein a plurality of instructions that when executed by the processor cause the computing device to perform the method of any of Examples 15-28.

Example 30 includes one or more machine readable storage media comprising a plurality of instructions stored thereon that in response to being executed result in a computing device performing the method of any of Examples 15-28.

Example 31 includes a computing device comprising means for performing the method of any of Examples 15-28.

Example 32 includes a network device for fabric security, the network device comprising means for enabling a first port of the network device, wherein the first port is coupled to a link partner; means for determining whether the first port is an edge port when enabling the first port, wherein determining whether the first port is an edge port comprises securely identifying whether the link partner coupled to the first port is a compute node; and means for enforcing a fabric management partition at the first port in response to determining that the first port is an edge port, wherein the first port is associated with a limited member of the management partition and the first port is prevented from communicating with other limited members of the management partition.

Example 33 includes the subject matter of Example 32, and wherein the means for securely identifying whether the link partner coupled to the first port is a compute node comprises means for establishing a backchannel communication session with a host fabric interface of the link partner using the first port; and means for receiving a node type indicator from the host fabric interface via the backchannel communication session.

Example 34 includes the subject matter of any of Examples 32 and 33, and wherein the means for enabling the first port of the network device comprises means for associating a limited membership partition key of the fabric management partition with the first port.

Example 35 includes the subject matter of any of Examples 32-34, and wherein the means for enforcing the fabric management partition at the first port comprises means for determining whether a partition key of a data packet received at the first port matches the limited membership partition key; and means for dropping the data packet in response to determining the partition key of the data packet does not match the limited membership partition key.

Example 36 includes the subject matter of any of Examples 32-35, and wherein the means for enforcing the fabric management partition at the first port comprises means for determining whether a partition key of a data packet to be transmitted from the first port matches the limited membership partition key; and means for dropping the data packet in response to determining the partition key of the data packet matches the limited membership partition key.

Example 37 includes the subject matter of any of Examples 32-36, and further comprising means for enabling a second port of the network device, wherein the second port is coupled to a management node, and wherein the management node is a full member of the fabric management partition and the management node is allowed to communicate with limited members of the management partition and full members of the management partition; and means for enforcing the fabric management partition at the second port.

Example 38 includes the subject matter of any of Examples 32-37, and wherein the means for enabling the first port of the network device comprises means for associating a limited membership partition key of the fabric management partition with the first port; and the means for enabling the second port of the network device comprises means for associating a full membership partition key of the fabric management partition with the second port.

Example 39 includes the subject matter of any of Examples 32-38, and wherein the means for enforcing the fabric management partition at the second port comprises means for determining whether a partition key of a data packet received at the second port matches the full membership partition key; and means for dropping the data packet in response to determining the partition key of the data packet does not match the full membership partition key.

Example 40 includes the subject matter of any of Examples 32-39, and wherein the means for enforcing the fabric management partition at the second port comprises means for determining whether a partition key of a data packet to be transmitted from the second port matches the full membership partition key or the limited membership partition key; and means for allowing the data packet in response to determining the partition key of the data packet to be transmitted from the first port matches the full membership partition key or the limited membership partition key.

Example 41 includes the subject matter of any of Examples 32-40, and further comprising means for initializing the second port; wherein the means for enabling the second port comprises means for enabling the second port in response to initializing the second port.

Example 42 includes the subject matter of any of Examples 32-41, and further comprising means for receiving a management message from a management node; wherein the means for enabling the second port comprises means for enabling the second port in response to receiving the management message.

Example 43 includes the subject matter of any of Examples 32-42, and further comprising means for determining whether a source local identifier of a data packet received at the first port matches a predefined source local identifier associated with the first port; and means for dropping the data packet in response to determining that the source local identifier of the data packet does not match the predefined source local identifier.

Example 44 includes the subject matter of any of Examples 32-43, and further comprising means for receiving the predefined source local identifier from a management node.

Example 45 includes the subject matter of any of Examples 32-44, and further comprising means for receiving a management message via the first port; and means for reducing a rate of credit return for the first port in response to receiving the management message.

What is claimed is:

1. A network device for fabric security, the network device comprising:
   a port management module to:
   enable a first port of the network device, wherein the first port is coupled to a link partner; and
   determine whether the first port is an edge port during enablement of the first port, wherein to determine whether the first port is an edge port comprises to securely identify whether the link partner coupled to the first port is a compute node; and
   a partition module to enforce a fabric management partition at the first port in response to a determination that the first port is an edge port, wherein the first port is associated with a limited member of the management partition and the limited member is prevented from communicating with other limited members of the management partition;
   wherein to securely identify whether the link partner coupled to the first port is a compute node comprises to establish a backchannel communication session with a host fabric interface of the link partner using the first port, and receive a node type indicator from the host fabric interface via the backchannel communication session.

2. The network device of claim 1, wherein:
   to enable the first port of the network device comprises to associate a limited membership partition key of the fabric management partition with the first port.

3. The network device of claim 2, wherein to enforce the fabric management partition at the first port comprises to:
   determine whether a partition key of a data packet received at the first port matches the limited membership partition key; and
   drop the data packet in response to a determination that the partition key of the data packet does not match the limited membership partition key.

4. The network device of claim 2, wherein to enforce the fabric management partition at the first port comprises to:
   determine whether a partition key of a data packet to be transmitted from the first port matches the limited membership partition key; and
   drop the data packet in response to a determination that the partition key of the data packet matches the limited membership partition key.

5. The network device of claim 1, wherein:
   the port management module is further to enable a second port of the network device, wherein the second port is coupled to a management node, and wherein the management node is a full member of the fabric management partition and the management node is allowed to communicate with limited members of the management partition and full members of the management partition; and
   the partition module is further to enforce the fabric management partition at the second port.

6. The network device of claim 5, wherein:
   to enable the first port of the network device comprises to associate a limited membership partition key of the fabric management partition with the first port; and
   to enable the second port of the network device comprises to associate a full membership partition key of the fabric management partition with the second port.

7. The network device of claim 5, further comprising:
   a management module to receive a management message from a management node;
   wherein to enable the second port comprises to enable the second port in response to receipt of the management message.

8. The network device of claim 1, further comprising a source identity module to:
   determine whether a source local identifier of a data packet received at the first port matches a predefined source local identifier associated with the first port; and
   drop the data packet in response to a determination that the source local identifier of the data packet does not match the predefined source local identifier.

9. The network device of claim 1, further comprising a flow control module to:
   receive a management message via the first port; and
   reduce a rate of credit return for the first port in response to receipt of the management message.

10. A method for fabric security, the method comprising:
    enabling, by a network device, a first port of the network device, wherein the first port is coupled to a link partner;
    determining, by the network device, whether the first port is an edge port when enabling the first port, wherein determining whether the first port is an edge port comprises securely identifying whether the link partner coupled to the first port is a compute node; and
    enforcing, by the network device, a fabric management partition at the first port in response to determining that the first port is an edge port, wherein the first port is associated with a limited member of the management partition and the first port is prevented from communicating with other limited members of the management partition;
    wherein securely identifying whether the link partner coupled to the first port is a compute node comprises establishing a backchannel communication session with a host fabric interface of the link partner using the first port, and receiving a node type indicator from the host fabric interface via the backchannel communication session.

11. The method of claim 10, wherein:
    enabling the first port of the network device comprises associating a limited membership partition key of the fabric management partition with the first port.

12. The method of claim 10, further comprising:
    enabling, by the network device, a second port of the network device, wherein the second port is coupled to a management node, and wherein the management node is a full member of the fabric management partition and the management node is allowed to communicate with limited members of the management partition and full members of the management partition; and
    enforcing, by the network device, the fabric management partition at the second port.

13. The method of claim 12, wherein:
enabling the first port of the network device comprises associating a limited membership partition key of the fabric management partition with the first port; and
enabling the second port of the network device comprises associating a full membership partition key of the fabric management partition with the second port.

14. The method of claim 12, further comprising:
receiving, by the network device, a management message from a management node;
wherein enabling the second port comprises enabling the second port in response to receiving the management message.

15. One or more non-transitory, computer-readable storage media comprising a plurality of instructions that in response to being executed cause a network device to:
enable a first port of the network device, wherein the first port is coupled to a link partner;
determine whether the first port is an edge port when enabling the first port, wherein determining whether the first port is an edge port comprises securely identifying whether the link partner coupled to the first port is a compute node; and
enforce a fabric management partition at the first port in response to determining that the first port is an edge port, wherein the first port is associated with a limited member of the management partition and the first port is prevented from communicating with other limited members of the management partition;
wherein to securely identify whether the link partner coupled to the first port is a compute node comprises to establish a backchannel communication session with a host fabric interface of the link partner using the first port, and receive a node type indicator from the host fabric interface via the backchannel communication session.

16. The one or more non-transitory, computer-readable storage media of claim 15, wherein:
to enable the first port of the network device comprises to associate a limited membership partition key of the fabric management partition with the first port.

17. The one or more non-transitory, computer-readable storage media of claim 15, further comprising a plurality of instructions that in response to being executed cause the network device to:
enable a second port of the network device, wherein the second port is coupled to a management node, and wherein the management node is a full member of the fabric management partition and the management node is allowed to communicate with limited members of the management partition and full members of the management partition; and
enforce the fabric management partition at the second port.

18. The one or more non-transitory, computer-readable storage media of claim 17, wherein:
to enable the first port of the network device comprises to associate a limited membership partition key of the fabric management partition with the first port; and
to enable the second port of the network device comprises to associate a full membership partition key of the fabric management partition with the second port.

19. The one or more non-transitory, computer-readable storage media of claim 17, further comprising a plurality of instructions that in response to being executed cause the network device to:
receive a management message from a management node;
wherein to enable the second port comprises to enable the second port in response to receiving the management message.

20. The one or more non-transitory, computer-readable storage media of claim 15, further comprising a plurality of instructions that in response to being executed cause the network device to:
determine whether a source local identifier of a data packet received at the first port matches a predefined source local identifier associated with the first port; and
drop the data packet in response to determining that the source local identifier of the data packet does not match the predefined source local identifier.

21. The one or more non-transitory, computer-readable storage media of claim 15, further comprising a plurality of instructions that in response to being executed cause the network device to:
receive a management message via the first port; and
reduce a rate of credit return for the first port in response to receiving the management message.

* * * * *